United States Patent Office 2,950,289
Patented Aug. 23, 1960

2,950,289

9α-HALO-A-NORPROGESTERONES

Frank L. Weisenborn, Middlebush, N.J., assignor to Olin Mathieson Chemical Corporation, New York, N.Y., a corporation of Virginia No Drawing. Filed July 28, 1959, Ser. No. 829,966

9 Claims. (Cl. 260—348)

This invention relates to the synthesis of new valuable compounds and more particularly has for its objects the provision of a method for preparing 9α-halo-11β-hydroxy (or 11-keto)-A-norprogesterones, the 9α-halo-11β-hydroxy (or 11-keto)-A-norprogesterones prepared thereby, and new intermediates utilizable in said preparation.

The final products of this invention can be represented by the general formula:

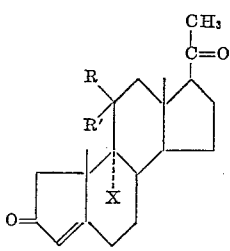

wherein R is hydrogen, R' is β-hydroxy, or together R and R' is keto (O=), and X is halogen. These final products are physiologically active substances which possess anti-androgenic activity and thus are useful in inhibiting or counteracting the effects of androgens, such as testosterone. The final products of this invention can therefore be used in the treatment of hyperandrogenic acne (the acne condition resulting from the over abundance of an androgen, such as testosterone), for which purpose they are administered either topically or systematically (e.g., subcutaneously) being formulated for such administration in conventional ointments or injectable liquid carriers.

These final products are prepared, in accordance with the processes of this invention by a series of steps, the first of which comprises interacting 11α-hydroxy-A-norprogesterone with an organic sulfonating agent, such as an organic sulfonyl halide, the reaction preferably being conducted in the presence of a tertiary base, such as pyridine. Particularly preferred among the sulfonating agents are the lower alkane sulfonyl chlorides (e.g. methanesulfonyl chloride and ethanesulfonyl chloride) and p-toluenesulfonyl chloride. The reaction results in the preparation of the new 11α-sulfonic acid ester intermediates of this invention having the general formula

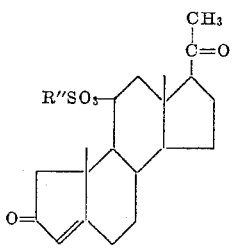

wherein R'' is preferably a lower alkyl or tolyl radical.

These sulfonic acid ester derivatives are then desulfonated to yield the new intermediate of this invention, $\Delta^{3,9(11)}$-A-norpregnadiene-2,20-dione. Among the suitable reactants utilizable in this step of the process of this invention may be mentioned the alkali metal salts of lower fatty acids (e.g. sodium acetate) in a medium comprising a lower fatty acid (e.g. acetic and propionic acid).

$\Delta^{3,9(11)}$-A-norpregnadiene-2,20-dione is then hydroxyhalogenated by treatment with either hydrochlorous or hydrobromous acid, preferably formed in situ by treatment of the diene with either an N-bromamide or N-bromimide of a carboxylic acid (e.g. N-bromamides of lower alkanoic acids, such as N-bromacetamide, and N-bromimides of lower alkanedioic acids, such as N-bromosuccinimide), dibromodimethylhydantoin, an N-chloramide or N-chlorimide of a carboxylic acid (e.g. N-chloramides of lower alkanoic acids, such as N-chloracetamide, and N-chlorimides of lower alkanedioic acids, such as N-chlorsuccinimide), or dichlorodimethylhydantoin, in an aqueous medium. The reaction is preferably conducted in an aqueous inert organic solvent, such as an alcohol, ketone or ether in the presence of a strong acid, such as perchloric acid, to increase the yield of the desired 9α-halo steroid. The reaction results in the preparation of those final products of this invention wherein R is hydrogen, R' is β-hydroxy, and X is bromo or chloro.

These 9α-bromo or chloro compounds are then treated with a basic reagent such as an alkali metal salt of a weak acid (e.g. an alkali metal salt of a lower fatty acid, such as an alkali metal acetate, or an alkali metal carbonate or bicarbonate, such as potassium carbonate) to form the new intermediate of this invention, $\Delta^3$-A-nonpregnene-9β,11β-oxido-2,20-dione of the structural formula

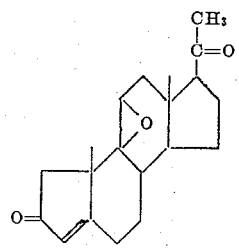

The 9β,11β-epoxide is then reacted with a hydrogen halide (i.e. hydrofluoric acid, hydrochloric acid, hydrobromic acid, and hydroiodic acid) thereby yielding the final products of this invention wherein X is hydrogen, R' is β-hydroxy and X is any one of the four halogens.

To prepare the corresponding 11-keto derivatives, the 11β-hydroxy compound is oxidized as by treatment with an oxidizing agent such as a hexavalent chromium compound (e.g., chromic acid).

The following examples are illustrative of the invention (all temperatures being in centigrade):

EXAMPLE 1

11α-hydroxy-A-norprogesterone 11α-mesylate (a) FERMENTATION

A medium of the following composition is prepared:

| | |
|---|---:|
| Corn steep liquor _____g__ | 36 |
| Brown sugar _____g__ | 10 |
| NaNO$_3$ _____g__ | 6 |
| KH$_2$PO$_4$ _____g__ | 1.5 |
| MgSO$_4$·7H$_2$O _____g__ | 0.5 |
| ZnSO$_4$ (1% aqueous solution) _____cc__ | 0.1 |
| CaCO$_3$ _____g__ | 5 |
| Lard oil _____g__ | 2 |
| Distilled water to make one liter. | |

50 ml. portions of the medium are distributed in each of five 250 ml. Erlenmeyer flasks and the flasks plugged with cotton and sterilized by autoclaving for 40 minutes at 120°. When cool, each of the flasks is inoculated with one loop of grown wheat grain containing *Aspergillus nidulans* (ATCC 11267), prepared as described hereinafter. The flasks are mechanically shaken for 20 hours on a rotary shaker (280 cycles/minute—2 inch radius) in a room maintained at 25°, after which time 10% transfers (by volume) are made to thirty-seven 250 ml. Erlenmeyer flasks (sterilized as described above), each containing 50 ml. of the following medium:

| | G. |
|---|---|
| Corn steep liquor | 6 |
| $NH_4H_2PO_4$ | 3 |
| $CaCO_3$ | 2.5 |
| Soybean oil | 2.2 |

Distilled water to make one liter.

Steam-sterilized for thirty minutes at 15 p.s.i.g. and neutralized to pH 7.0 with sodium hydroxide solution.

Immediately after inoculation, to each of the second series of flasks is added 0.25 ml. of a 20 mg./ml. solution of A-norprogesterone in N,N-dimethylformamide. These flasks are then incubated under the same conditions as used for the first series of flasks for 24 hours, after which the contents of the flasks are pooled and filtered by suction through Seitz clarifying pads. [The inoculum used is grown from stock cultures of *Aspergillus nidulans* (ATCC 11267) for three months in a medium of the following composition: wheat, 10 g. and distilled water, 15 cc.]

(b) ISOLATION OF 11α-HYDROXY-A-NORPROGESTERONE

The aqueous filtrate obtained in step *a* (1972 ml.) is extracted four times with 250 ml. portions of chloroform. The combined chloroform extracts are washed with water, dried over sodium sulfate and evaporated to dryness under vacuum leaving a residue weighing about 197 mg. The residue is dissolved in benzene and chromatographed on 7 g. of acid-washed alumina. Elution of the column with benzene gives first about 11 mg. of 6β-hydroxy-A-norprogesterone, M.P. about 217–219°. Further elution with 50–100% chloroform-benzene gives 11α-hydroxy-A-norprogesterone. Recrystallization from ethyl acetate-hexane gives about 55 mg. of the product, M.P. about 183–184°; $[\alpha]_D+93°$ (chloroform);

$$\lambda_{max.}^{EtOH} 233\ m\mu\ (\log \epsilon=4.16);$$

$$\lambda_{max.}^{Nujol} 2.90\mu,\ 2.97\mu,\ 5.88\mu,\ 6.05\mu,\ 6.18\mu.$$

*Analysis.*—Calcd. for $C_{20}H_{28}O_3$: C, 75.91; H, 8.92. Found: C, 75.81; H, 8.92.

(c) PREPARATION OF 11α-HYDROXY-A-NORPROGESTERONE 11α-MESYLATE 910 mg. of 11α-hydroxy-A-norprogesterone is dissolved in 16 ml. of anhydrous pyridine. The solution is cooled to 0° treated with 0.78 ml. of methanesulfonyl chloride and allowed to stand in the refrigerator for 16 hours. Ice is then added and the mixture extracted with chloroform. The combined chloroform extracts are washed with 1 N hydrochloric acid, water, saturated sodium chloride, dried over sodium sulfate and concentrated to dryness. The residue is recrystallized from ethanol-water to yield about 1.01 g. of 11α-hydroxy-A-norprogesterone 11α-mesylate, M.P. about 162–164°, $[\alpha]_D+89°$ (chloroform).

Similarly, by substituting an equivalent amount of ethanesulfonyl chloride and p-toluenesulfonyl chloride for the methanesulfonyl chloride in the procedure of Example 1, step c, the 11α-ethanesulfonic acid ester and 11α-p-toluenesulfonic acid ester of 11α-hydroxy-A-norprogesterone are obtained, respectively.

EXAMPLE 2

$\Delta^{3,9(11)}$-A-norpregnadiene-2,20-dione

A solution of 1.00 g. of 11α-hydroxy-A-norprogesterone 11α-mesylate, 40 ml. of propionic acid, and 3.0 g. of sodium acetate is heated under reflux for four hours and then one-half of the propionic acid is removed by distillation in vacuo. The resulting solution is diluted with water, washed free of propionic acid with 5% sodium carbonate solution, washed again with water, dried over sodium sulfate, and concentrated to dryness. The resulting crystalline residue (about 836 mgs.) is freed of pigmented impurities by filtering this material dissolved in benzene through a short column of acid-washed alumina. The material obtained by evaporating the filtrate crystallizes from hexane to yield about 648 mg. of colorless diene, M.P. about 154–156°, $[\alpha]_D+101.5°$ (chloroform).

EXAMPLE 3

9α-bromo-11β-hydroxy-A-norprogesterone $\Delta^{3,9(11)}$-A-norpregnadiene-2,20-dione (648 mg.) is dissolved in 25 ml. of dioxane, diluted with 15 ml. of 0.1 N perchloric acid and the resulting solution treated with 565 mg. of N-bromoacetamide. This solution is allowed to stand in the dark for 30 minutes, treated with a few drops of aqueous sodium sulfite, diluted with water and extracted with chloroform. The combined chloroform extracts are washed with water, saturated sodium chloride solution, dried over sodium sulfate, and concentrated to dryness leaving about 834 mg. of crude crystalline product. Recrystallization from methylene chloride-ether gives about 601 mg. of pure 9α-bromo-11β-hydroxy-A-norprogestrone M.P. about 157–158°; $[\alpha]_D+105°$ (chloroform).

Similarly, by substituting an equivalent amount of N-chloroacetamide for the N-bromoacetamide in the procedure of Example 3, 9α-chloro-11β-hydroxy-A-norprogesterone is formed.

EXAMPLE 4

$\Delta^3$-norpregnene-9β,11β-oxido-2,20-dione

A solution of 579 mg. of 9α-bromo-11β-hydroxy-A-norprogesterone in 70 ml. of methanol and 7.2 ml. of 10% potassium carbonate is allowed to stand at room temperature for two hours. An equal volume of water is then added and the methanol removed in vacuo. As the methanol is removed about 338 mg. of the $\Delta^3$-A-norpregnene-9β,11β-oxido-2,20-dione crystallizes in colorless needles, M.P. about 123–124°, $[\alpha]_D+67°$ (chloroform).

EXAMPLE 5

9α-fluoro-11β-hydroxy-A-norprogesterone

A solution of 62 mg. of $\Delta^3$-A-norpregnene-9β,11β-oxido-2,20-dione in 3.0 ml. of chloroform and 1.0 ml. of tetrahydrofuran contained in a polyethylene bottle is cooled in an acetone-Dry Ice bath and treated with 1.0 ml. of liquid hydrogen fluoride. The mixture is allowed to stand at 4° for five hours and then added slowly to a stirred mixture of 100 ml. of saturated sodium bicarbonate solution and 50 ml. of chloroform. The layers are separated and the chloroform extract washed with water, dried over sodium sulfate, and concentrated to dryness. The product is recrystallized from ether to give colorless needles, about 46 mg., M.P. about 213–214° $[\alpha]_D+121°$ (chloroform).

EXAMPLE 6

9α-chloro-11β-hydroxy-A-norprogesterone

To a solution of 62 mg. of $\Delta^3$-A-norpregnene-9β,11β-oxido-2,20-dione in 3.0 ml. of chloroform is added at 0°, 0.5 ml. of 0.5 N hydrogen chloride in chloroform. The solution is allowed to stand at room temperature for one hour, and then extracted with dilute sodium bicarbonate solution. The chloroform solution is washed with water, dried over sodium sulfate and the solvent removed in vacuo. The resulting 9α-chloro-11β-hydroxy-A-norprogesterone is recrystallized from ether.

In a similar manner, by substituting an equivalent amount of hydrogen bromide and hydrogen iodide for the hydrogen chloride in the procedure of Example 6, 9α-bromo-11β-hydroxy-A-norprogesterone and 9α-iodo-11β-hydroxy-A-norprogesterone are formed, respectively.

EXAMPLE 7

9α-fluoro-11-keto-A-norprogesterone

To a solution of 9α-fluoro-11β-hydroxy-A-norprogesterone (50 mgs.) in 5 ml. of glacial acetic acid is added at room temperature an equvalent amount of chromic acid in acetic acid (2 ml.). After 30 minutes a little alcohol is added and the mixture concentrated. The residue is taken up in chloroform and the chloroform solution is washed with water, dried over sodium sulfate and concentrated to dryness. The residue of 9α-fluoro-11-keto-A-norprogesterone is then recrystallized from ether.

Similarly, by substituting an equivalent amount of 9α-chloro-11β-hydroxy-A-norprogesterone, 9α-bromo-11β-hydroxy-A-norprogesterone, and 9α-iodo-11β-hydroxy-A-norprogesterone for the 9α-fluoro-11β-hydroxy-A-norprogesterone in the procedure of Example 7, 9α-chloro-11-keto-A-norprogesterone, 9α-bromo-11-keto-A-norprogesterone and 9α-iodo-11-keto-A-norprogesterone are obtained respectively.

The invention may be variously otherwise embodied within the scope of the appended claims.

What is claimed is:
1. A compound of the general formula

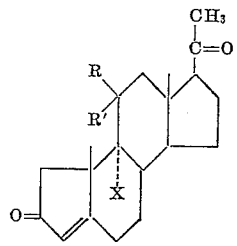

wherein R is hydrogen, R' is β-hydroxy and together R and R' is keto, and X is halogen.
2. 9α-bromo-11β-hydroxy-A-norprogesterone.
3. 9α-fluoro-11β-hydroxy-A-norprogesterone.
4. 9α-fluoro-11-keto-A-norprogesterone.
5. An ester of 11α-hydroxy-A-norprogesterone with an organic sulfonic acid selected from the group consisting of lower alkanesulfonic acids and p-toluenesulfonic acid.
6. 11α-hydroxy-A-norprogesterone 11α-mesylate.
7. $\Delta^{3,9(11)}$-A-norpregnadiene-2,20-dione.
8. $\Delta^3$-A-norpregnene-9β,11β-oxido-2,20-dione.
9. 9α-chloro-11β-hydroxy-A-norprogesterone

References Cited in the file of this patent
UNITED STATES PATENTS

| | | |
|---|---|---|
| 2,760,980 | Meyer et al. | Aug. 28, 1956 |
| 2,786,837 | Farrar et al. | Mar. 26, 1957 |
| 2,822,380 | Clinton | Feb. 4, 1958 |
| 2,822,381 | Dodson et al. | Feb. 4, 1958 |
| 2,835,698 | Magerlein et al. | May 20, 1958 |
| 2,902,495 | Webb | Sept. 1, 1959 |

UNITED STATES PATENT OFFICE
CERTIFICATION OF CORRECTION

Patent No. 2,950,289                                        August 23, 1960

Frank L. Weisenborn

It is hereby certified that error appears in the above numbered patent requiring correction and that the said Letters Patent should read as corrected below.

Column 1, lines 58 to 68, the formula should appear as shown below instead of as in the patent:

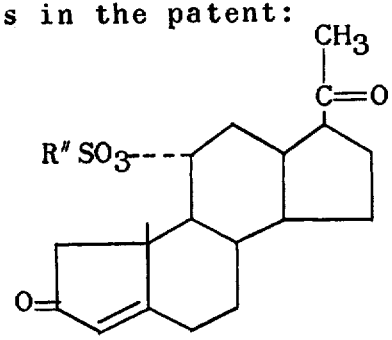

column 4, line 43, Example 4, for "$\Delta^3$-norpregnene-9$\beta$,11$\beta$-oxido-2,20-dione" read -- $\Delta^3$-A-Norpregnene-9$\beta$,11$\beta$-oxido-2,20-dione --.

Signed and sealed this 9th day of May 1961.

(SEAL)
Attest:

ERNEST W. SWIDER                                              DAVID L. LADD
Attesting Officer                                       Commissioner of Patents